May 11, 1948.  L. G. ZESBAUGH  2,441,525
ARTICLE REMOVING MEANS
Filed Sept. 29, 1943  2 Sheets-Sheet 1

Inventor
LAWRENCE G. ZESBAUGH
By Chas. C. Reif
Attorney.

May 11, 1948.  L. G. ZESBAUGH  2,441,525
ARTICLE REMOVING MEANS
Filed Sept. 29, 1943  2 Sheets-Sheet 2

Inventor
LAWRENCE G. ZESBAUGH
By Chas. C. Reif
Attorney.

Patented May 11, 1948

2,441,525

UNITED STATES PATENT OFFICE 2,441,525

ARTICLE REMOVING MEANS

Lawrence G. Zesbaugh, Minneapolis, Minn.

Application September 29, 1943, Serial No. 504,265

2 Claims. (Cl. 93—36)

This invention relates to a device for manufacturing threaded caps or rings and particularly to a device for removing said caps, rings or other threaded articles from the die on which they are formed.

While the invention could be applied to many machines it specifically is shown applied to such a machine as disclosed and claimed in applicant's co-pending application S. N. 483,921, filed April 21, 1943. In said machine a die is shown having a grooved or threaded upper end and the article formed thereon which is illustrated as a cap is pressed about said grooved or threaded end of the die so that it is very tightly held thereon. The formed member adheres so tightly to the die that it is not feasible to have the same removed by hand.

It is an object of this invention to provide a simple and efficient means for removing an article from a die such as a grooved or threaded die about which it has been pressed.

It is a further object of the invention to provide a machine for removing an article from a grooved or threaded die, comprising a member on which the die is carried and moved, together with a member or block of frictional material past which the die is moved so that the periphery of the said article engages said block and said article is given a partial rotation to loosen it on the die.

It is further an object of the invention to provide such a machine as above set forth in which a rotating wheel is also used to engage the said article and to rotate said article after it has passed said member or block to remove it from said die.

It is still another object of the invention to provide a machine for removing an article from a die having a threaded upper portion and on which said article has been pressed comprising a wheel having a periphery for frictionally engaging the periphery of said article so as to rotate the same and remove it from the die and means for moving said die past said wheel so that the latter engages said article.

These and other objects and advantages of the invention will be fully set forth in the following description made in connection with the accompanying drawings in which like reference characters refer to similar parts throughout the several views and in which.

Figure 1:
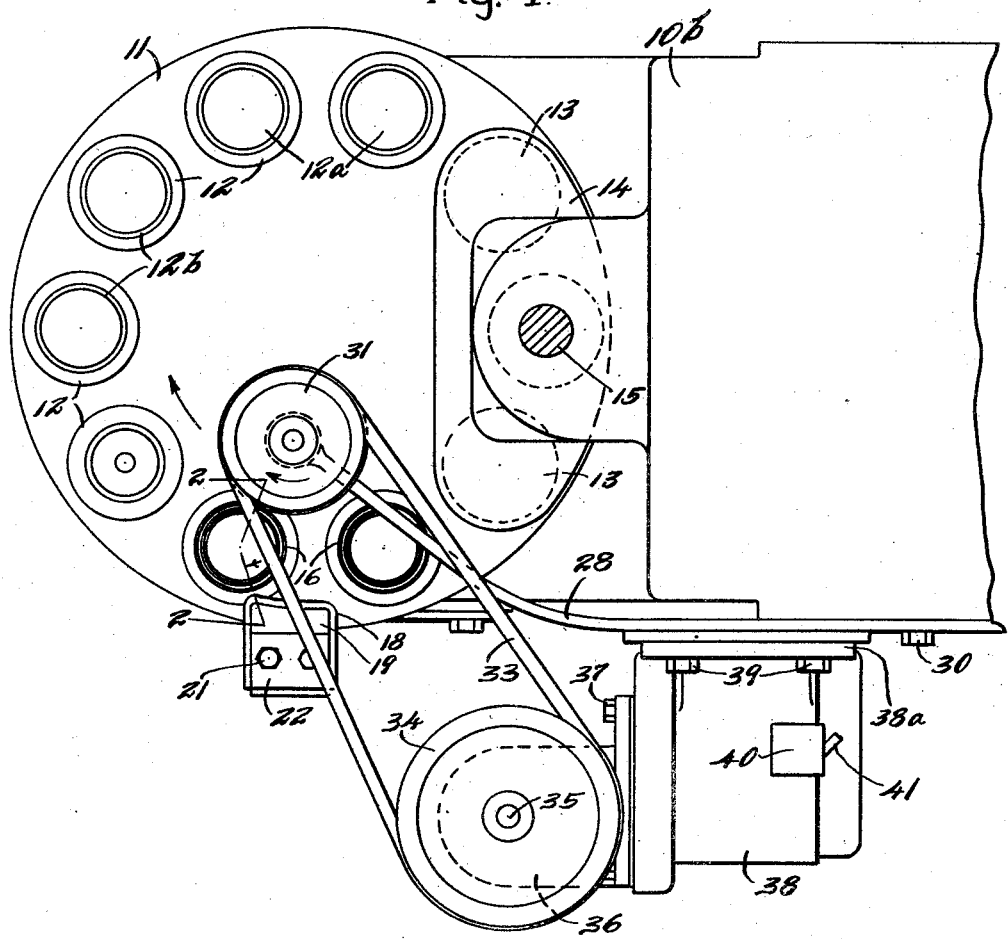
Fig. 1 is a plan view of the device a portion being shown in horizontal section.
Figure 2:
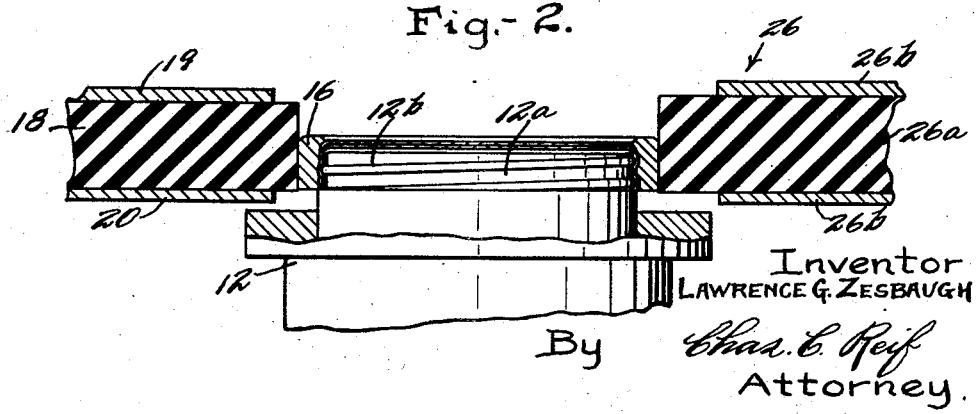
Fig. 2 is a vertical section taken substantially on line 2—2 of Fig. 1 as indicated by the arrow.
Figure 3:
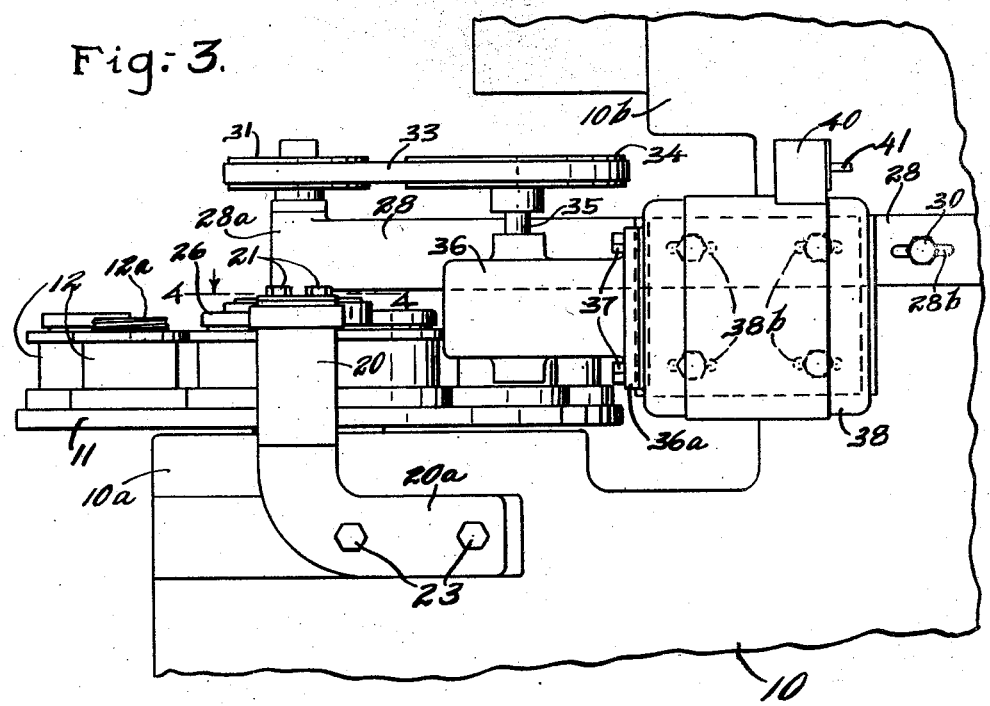
Fig. 3 is a view in side elevation of the device.
Figure 4:
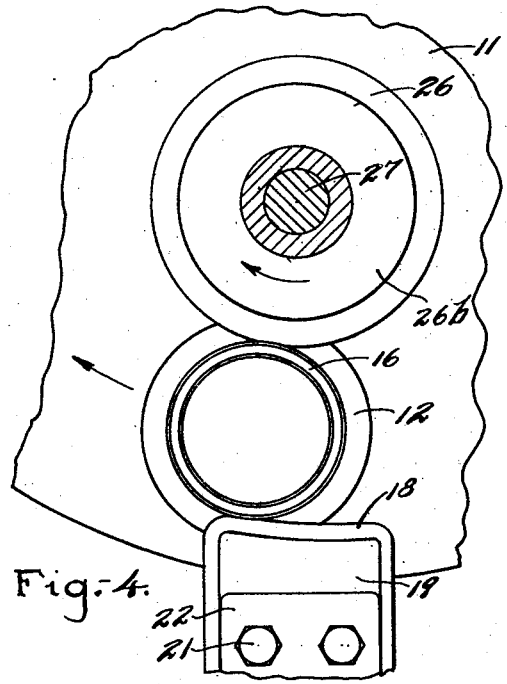
Fig. 4 is a horizontal section taken substantially on line 4—4 of Fig. 3 as indicated by the arrow and Fig. 5 is a partial view in side elevation.
Figure 5:
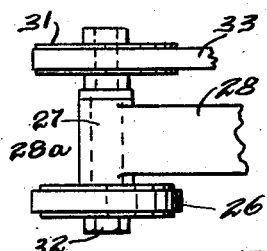

Referring to the drawings a machine is shown comprising a frame or housing 10. This housing comprises a front portion 10a in which a plate or turret 11 is mounted for rotation about a central vertical axis. Plate 11 has mounted thereon in circumferentially spaced relation a plurality of dies 12. While these dies might be variously formed, in the embodiment of the invention illustrated, they are shown as having respectively upper ends 12a on which is formed a rib or ribs 12b preferably in the form of a helix, thus forming a thread. Said dies are of the form illustrated in the above entitled co-pending application and the dies on turret or plate 11 cooperate with upper dies 13 carried on a plunger head 14 which is reciprocated vertically by a shaft 15 and is guided in suitable guides in the upper portion 10b of the housing. Turret 11 is intermittently operated to bring dies 12 successively under the dies 13 and the articles 16 such as the cap illustrated are formed on the dies and then moved laterally away from the head 14 in a horizontal circular path as indicated by the arrow in Fig. 1.

In accordance with the present invention a member or block 18 of frictional material such as rubber or similar material is provided, the same being held between metal plates 19 and 20. Block 18 is generally of rectangular shape in plan and has one corner which protrudes slightly. Plates 19 and 20 are shaped similarly to block 18 but are somewhat smaller so that block 18 projects therebeyond. The block 18 and plates 19 and 20 are held in assembled relation by a plurality of screws 21 which extend therethrough and also through a small top plate 22. Lower plate 20 is bent to extend vertically and form a bracket and has a lower horizontally extending portion 20a secured to the side of housing portion 10a by suitable cap screws 23.

A wheel 26 is provided, the same being illustrated as having a central annular portion 26a of frictional material such as rubber or similar material which portion is held between and secured to circular plates 26b of smaller diameter. Wheel 26 is secured to a shaft 27 which is journalled in the bearing portion 28a of an arm 28. Arm 28 is shown as in the form of a flat bar and extends diagonally outward and then extends along one side of housing 10 in contact therewith, said bar being secured to housing 10 by a plurality of screws 30 which extend through slots 28b in bar 28. Bar 28 is thus mounted for some longitudinal adjustment. Shaft 27 has secured to its upper end a pulley 31 preferably of the grooved type and said shaft has a nut 32 at its lower end below wheel 26. A belt 33 runs over pulley 31 and also over pulley 34 also preferably of the grooved type. Pulley 34 is secured to a shaft 35 projecting from a speed-reducing device 36 having flange 36a secured by a plurality of screws 37 to one side of an electric motor 38. The driving or armature shaft of the motor extends into and actuates the speed reducing device 36. Motor 38 has a flange 38a which is secured to bar 28 and thus to housing 10 by a plurality of screws 39 which preferably extend through slots 38b in flange 38a. A switch box 40 is shown for motor 38 and a conductor-carrying cord 41 extends from switch box 40 and will be connected to some suitable source of current.

Blanks for the articles to be formed such as caps, will be placed upon the dies as they approach the head 14. The blanks will be operated upon by the dies and the dies will move away from under the head 14 with the finished article pressed thereon. When the article such as a cap is thus tightly pressed upon the die it is rather difficult to remove it and it is not feasible to have the caps removed directly by operators. In operation motor 38 will be actuated and this through the gear-reducing mechanism 36 will drive shaft 35 and pulley 34. Wheel 26 will be driven through belt 33 and pulley 31. With the present invention a die 12 with the article thereon moves with plate 11 so that the die moves past the block 18. The inner edge of block 18 is located so that the periphery of the cap or article 16 engages the side of the block and the article is pressed against the block so that a drag is placed on the article tending to rotate it in the direction to move it off of the threaded portion 12a. The article is thus loosened on the die and as the article moves along the remote portion of the block it is also engaged by the periphery of the rotating wheel 26. Wheel 26 rotates in a direction to move the article to cause it to move off of the threaded portion 12a of the die. For a short distance the wheel 26 is engaging the article while it is still engaged by block 18 so that there is a joint action of the block and wheel in starting the movement of the article. As the article moves out of engagement with block 18 it is still engaged firmly by wheel 26 and is now rotated at comparatively high speed so that it quickly screws upward off of thread 12a and is thrown to one side of plate 11 by the wheel 26. The article passes into a suitable chute or receptacle (not shown) and is directed to the desired place. The articles formed on the die such as the caps are thus quickly and efficiently removed by the machine without the interposition of the operator.

From the above description it will be seen that I have provided quite a simple and very efficient device for removing the articles such as caps from a die upon which they have been pressed. The articles are removed without making any change in their form and are conveniently discharged at one side of the machine. It is thus only necessary for the operator to feed the blanks to the machine. The device has been demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A device for removing articles from dies having in combination, a rotatable member, a plurality of dies carried by said member and movable therewith, said dies having helical grooves and ribs at their ends about which articles have been pressed, means for rotating said member, a block of frictional material past which said dies are moved in the rotation of said member so that one side of said articles successively engage said block and are partially rotated thereby to loosen the same on said dies, and a wheel disposed substantially at an opposite side of said article from that engaged by said block and adapted to successively engage the periphery of said articles in the movement of said member as they are still engaged by said block to assist in loosening said articles and immediately thereafter to separately engage said articles for rotating the same after they have passed said block to remove the same from said dies.

2. A device for removing an article from a die having in combination, a die having a screw thread at its end on which an article has been pressed, means for moving said die horizontally, a member of frictional material past which said die is moved so that said article engages said block, a wheel having a periphery for engaging the periphery of said article positioned at a side substantially opposite said block and means for rotating said wheel to first cooperate with said member to loosen said article and then to act subsequently to remove said article from said die.

LAWRENCE G. ZESBAUGH.

REFERENCES CITED

The following references are of record in the file of this patent:

UNITED STATES PATENTS

| Number | Name | Date |
|---|---|---|
| 2,155,316 | Lauterbach | Apr. 18, 1939 |
| 2,317,823 | Strauss | Apr. 27, 1943 |

FOREIGN PATENTS

| Number | Country | Date |
|---|---|---|
| 303,122 | Great Britain | June 27, 1929 |